(12) United States Patent
Li

(10) Patent No.: US 10,017,623 B2
(45) Date of Patent: Jul. 10, 2018

(54) HYDROLYSIS STABILIZER FOR THERMOPLASTIC MOLDING COMPOSITIONS

(75) Inventor: Xiangyang Li, Seven Fields, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 11/447,581

(22) Filed: Jun. 6, 2006

(65) Prior Publication Data

US 2007/0278452 A1 Dec. 6, 2007

(51) Int. Cl.
  *C09K 15/00* (2006.01)
  *C08K 5/29* (2006.01)
  *C08K 3/22* (2006.01)

(52) U.S. Cl.
  CPC ........ *C08K 3/22* (2013.01); *C08K 2003/2227* (2013.01)

(58) Field of Classification Search
  CPC .......... C09K 15/02; C09K 15/22; C08K 3/22; C08K 5/0005; C08K 5/29
  USPC .............................. 252/397, 400.1, 401, 405
  See application file for complete search history.

(56) References Cited

U.S. PATENT DOCUMENTS

| 4,071,503 A | 1/1978 | Thomas et al. ............. 260/75 N |
| 4,110,302 A | 8/1978 | Thomas et al. ............. 260/40 R |
| 4,187,358 A * | 2/1980 | Kyo et al. ..................... 525/132 |
| 5,733,959 A | 3/1998 | Heitz et al. .................... 524/195 |
| 5,804,626 A * | 9/1998 | Rogers et al. ................ 524/195 |
| 6,831,120 B1 | 12/2004 | Zobel et al. ................... 524/124 |
| 6,855,758 B2 | 2/2005 | Murschall et al. ........... 524/195 |
| 7,259,200 B2 | 8/2007 | Bauer et al. .................. 524/126 |
| 2004/0227130 A1* | 11/2004 | Hoerold et al. .............. 252/601 |
| 2005/0143503 A1 | 6/2005 | Bauer et al. .................. 524/115 |
| 2005/0154148 A1 | 7/2005 | Nakamichi et al. .......... 525/450 |
| 2006/0074155 A1* | 4/2006 | Wit et al. ...................... 524/115 |
| 2006/0217469 A1* | 9/2006 | Bauer et al. .................. 524/115 |

FOREIGN PATENT DOCUMENTS

EP  0850985 A1  7/1998
EP  1 498 460 A1  1/2005

OTHER PUBLICATIONS

Polyurethanes, (month unavailable) 1992, pp. 122-127, 34$^{th}$ Annual Polyurethane Technical Marketing Conference, Oct. 21-24, 1992, E.R. McAfee, "Sterically Hindered Carbodiimides: Use of Selective Agents for Hydrolytic Protection of Ester and Imide Groups-Review of Past Present, and Future".

* cited by examiner

*Primary Examiner* — Peter F Godenschwager
(74) *Attorney, Agent, or Firm* — Richard P. Bender; John E. Mrozinski, Jr.; Aron Preis

(57) ABSTRACT

A hydrolytic stabilizer mixture is disclosed. The mixture comprise i) at least one carbodiimide and ii) co-stabilizer selected from the group consisting of aluminum oxide and aluminum oxyhydroxide. The mixture is useful in imparting to polymeric systems improved resistance to hydrolysis.

11 Claims, No Drawings

HYDROLYSIS STABILIZER FOR THERMOPLASTIC MOLDING COMPOSITIONS

FIELD OF THE INVENTION

The invention relates to a stabilizer against hydrolysis of polymers and more particularly to a stabilizer mixture that containing carbodiimide and to a material system containing the same.

BACKGROUND OF THE INVENTION

Certain thermoplastic resins, e.g. polyalkylene terephthalates, polyamide and polycarbonate, and their blends are well known and widely used because of their excellent mechanical properties. A significant disadvantage characterizing these materials is a susceptibility to deterioration upon exposure to hot water or water vapor.

Incorporation of carbodiimides in polyalkylene terephthalate is known to improve the resistance of this resin to hydrolysis. U.S. Pat. No. 4,110,302 disclosed a process for producing a reinforced polyalkylene terephthalate molding resin composition. In the process polyalkylene terephthalate polymer in the molten state is mixed with a reinforcing agent and polycarbodiimide. The polycarbodiimide is derived from an aromatic diisocyanate and contains at least two carbodiimide units per polycarbodiimide molecule.

U.S. Pat. No. 4,071,503 disclosed a process for preparing a polycarbodiimide modified thermoplastic polyester whereby polycarbodiimide is incorporated into the structure of thermoplastic saturated polyester, having at least one carboxyl end group. The polycarbodiimide is derived from an aromatic diisocyanate and contains at least three carbodiimide units per polycarbodiimide molecule.

U.S. Pat. No. 5,733,959 disclosed a thermoplastic molding composition comprising polyester or its blends with polycarbonate or a polyamide and a carbodiimide conforming to a structural formula, the composition said to feature improved resistance to hydrolysis.

U.S. Pat. No. 6,855,758 disclosed a hydrolysis stabilizer in the context of polyester. In one preferred embodiment, the stabilizer is polymeric aromatic-carbodiimides and a blend of an organic phosphite and hydroxyphenyl propionate.

Also presently relevant is the article "Sterically Hindered Carbodiimides: Use of Selective Agents for Hydrolytic Protection of Ester and Imide Groups-Review of Past, Present, and Future" McAfee, E. R. Rhein Chemie Corporation, Pittsburgh, Pa., USA. Proceedings of the SPI Annual Technical/Marketing Conference (1992), 34th (Polyurethanes 92), pp 122-7.

Thermoplastic molding compositions that contain polyester carbonate and an inorganic powder, such as boehmite have been disclosed in U.S. Pat. No. 6,831,120.

SUMMARY OF THE INVENTION

A stabilizer mixture comprising: i) at least one carbodiimide and ii) co-stabilizer selected from the group consisting of aluminum oxide and aluminum oxyhydroxide is disclosed. The mixture is useful in imparting to polymeric systems improved resistance to hydrolysis.

DETAILED DESCRIPTION OF THE INVENTION

The inventive stabilizer comprise (i) a carbodiimide, and (ii) a co-stabilizer in a weight ratio of (i)/(ii) of 0.01:1 to 1:0.01.

A carbodiimide in the present context is a compound the molecule of which has at least one carbodiimide group. These compounds are known and available in commerce, e.g., Stabaxol P a product of Rhein Chemie Corporation and may be prepared by known methods (see for instance European Patent No. 582983; Japanese Patent Publication No. 33279/1972; Journal of Organic Chemistry, 28, 2069-2075 91963); Chemical Review 1981, vol. 81, No. 4, 619-621; Journal of Applied Polymer Science, 1977, vol. 21, 1999-2008, all incorporated herein by reference).

Suitable carbodiimides include compounds conforming to formula (I)

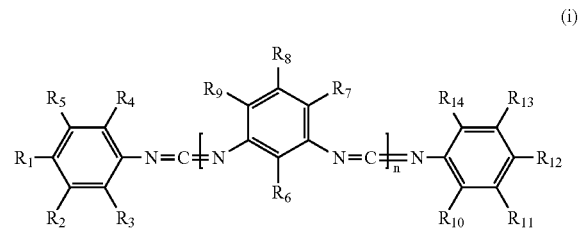

(i)

where $R^1$-$R^{14}$ independently one of the others denote a member selected from the group consisting of hydrogen, halogen, aliphatic, aromatic, cycloaliphatic and alkoxy radicals and n is 0 to 500, preferably 1 to 100, more preferably 3 to 50.

A particularly suitable carbodiimide conforms to formula (ii)

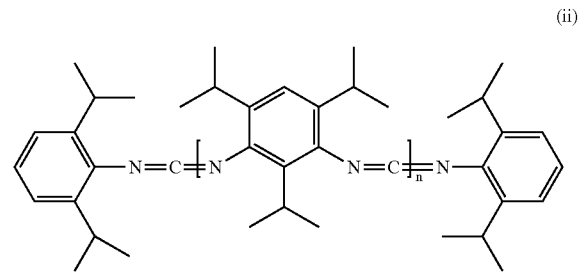

(ii)

where n is 0 to 50, preferably 5 to 45.

Also suitable are the carbodiimides disclosed in U.S. Pat. Nos. 5,733,959, 6,362,247, 5,373,080 and 5,650,476 all incorporated herein by reference.

The co-stabilizer suitable in the context of the invention is a member selected from the group consisting of aluminum oxide and aluminum oxyhydroxide.

Aluminum oxyhydroxide is preferred and boehmite (γ-AlO(OH)) and pseudoboehmite (γ-AlO(OH).x H2O where 0<x<1) are most preferred.

The co-stabilizer is generally in particulate form having average particle size of less than a few microns, preferably the co-stabilizer is nano-scale particle. The average particle diameters of the nano-particles are smaller than or equal to 200 nm, preferably smaller than or equal to 150 nm, in particular 1 to 100 nm. Particle size and particle diameter denote the median particle diameter ($d_{50}$), determined by ultracentrifuge measurements in accordance with W. Scholtan et al., Kolloid-Z. und Z. Polymere 250 (1972), pp. 782-796.

Polymeric material systems that are deficient in their resistant to hydrolysis are improved upon the incorporation of the inventive stabilizer mixture therein. The amount of stabilizer mixture is at least 0.01, preferably 0.5 most preferably 1.0 percent relative to the weight of the stabilized polymeric material system. The carbodiimide may be present in an amount of 0.01 to 10, preferably 0.1 to 5, more preferably 0.2 to 2 percent relative to the weight of the stabilized polymeric system. The co-stabilizer may be present in an amount of 0.01 to 20, preferably 0.1 to 10, more preferably 0.2 to 2 percent relative to the weight of the stabilized polymeric system.

The material systems suitable to be stabilized by the stabilizing mixture of the invention include resins that are known to have poor resistance to hydrolysis, e.g., polyester, polyamide, polycarbonate, and the blends of these.

Thermoplastic polyester resins suitable in the context of the present invention are characterized in that their intrinsic viscosity is at least about 0.4 and preferably about 0.6 to about 1.6 dl/gm (determined as a 1% solution in a 60:40 mixture of phenol and tetrachloroethane at 30° C.). Such resins are available in commerce or in the alternative may be prepared by known means, e.g., alcoholysis of esters of terephthalic acid with ethylene glycol followed by polymerization, by heating the glycols with the free acids or with their halide derivative.

Essentially these polyesters may be prepared by condensing primarily aromatic dicarboxylic acids (or an ester forming compound thereof) with a glycol (or an ester forming compound thereof). Suitable dicarboxylic acids include aromatic dicarboxylic acids (e.g., terephthalic acid, isophthalic acid, orthophthalic acid, 2,6-naphthalene dicarboxylic acid, 1,5-naphthalene dicarboxylic acid) and aliphatic dicarboxylic acids (e.g., adipic acid, sebacic acid, and azelaic acid) and cycloaliphatic dicarboxylic acids (e.g., 1,3-cyclohexane dicarboxylic acid, 1,4-cyclohexane dicarboxylic) or ester forming compounds thereof.

Suitable glycols include aliphatic diols having 2 to 10 carbon atoms (e.g., ethylene glycol, 1,3-propylene glycol, 1,4-butanediol, neopentyl glycol, 1,5-pentanediol, 1,6-hexanediol, decamethylene glycol, cyclohexanediol) as well as long-chain glycols (molecular weight of up to about 6000) such as poly(tetramethylene glycol) and mixtures thereof.

Polyethylene terephthalate is the preferred polyester. The dicarboxylic acid component of the polyethylene terephthalate is mainly terephthalic acid although it may contain up to 10 mol %, based on the total moles of acid, of other aromatic dicarboxylic acids having 6 to 14 carbon atoms, of aliphatic dicarboxylic acids having 4 to 8 carbon atoms or of cycloaliphatic dicarboxylic acids having 8 to 12 carbon atoms. Examples of such dicarboxylic acids which may be included with terephthalic acid are phthalic acid, isophthalic acid, naphthalene-2,6-dicarboxylic acid, diphenyl-4,4-dicarboxylic acid, adipic acid, sebacic acid and cyclohexanediacetic acid.

The diol component of the polyethylene terephthalate is mainly ethylene glycol yet it may contain up to 10 mol % of aliphatic diols having 3 to 12 carbon atoms, cycloaliphatic diols having 6 to 15 carbon atoms or aromatic diols having 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(.beta.-hydroxyethoxy)-benzene, 2,2-bis(4-hydroxycyclohexyl)-propane, 2,4-dihydroxy-1,1,3-3-tetramethyl-cyclobutane, 2,2-bis-(3-beta-hydroxyethoxyphenyl)-propane and 2,2-bis-(4-hydroxypropoxyphenyl)-propane.

Polyethylene terephthalates derived from terephthalic acid and ethylene glycol are preferred and homopolyethylene terephthalate that is derived substantially only from ethylene glycol and terephthalic acid or its esters, or its anhydride is most preferred.

The suitable polyesters may be branched in accordance with known methods. Polyethylene terephthalate, the preferred polyester may be branched by incorporating relatively small amounts of tri-hydric or tetra-hydric alcohols or tri-basic or tetra-basic acids, in a manner well known in the art. Suitable branching agents include trimesic acid, pyromellitic acid, trimethylolpropane and ethane, and pentaerythritol. Advantageously no more than 1 mol % relative to the quantity of acid component, of branching agent is used.

Aromatic polycarbonates and/or aromatic polyester carbonates suitable in the context of the invention are known are available in commerce and may be produced using known processes (for the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates proceeds for example by melting processes or by reacting aromatic dihydroxy compounds with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using known branching agents, for example triphenols or tetraphenols.

Aromatic dihydroxy compounds for producing aromatic polycarbonates and/or aromatic polyester carbonates are preferably those of the formula (I)

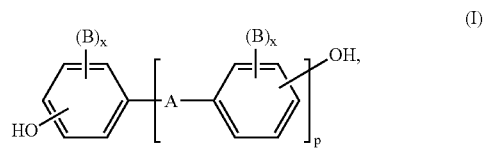

(I)

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic rings optionally containing heteroatoms may be fused, or a residue of the formula (II) or (III)

(II)

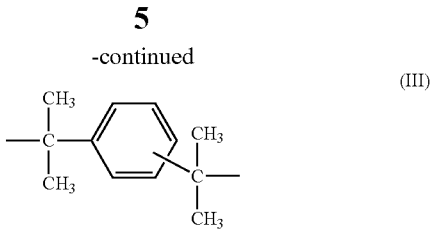

(III)

B is in each case $C_1$ to $C_{12}$ alkyl, preferably methyl, halogen, preferably chlorine and/or bromine, x is in each case mutually independently 0, 1 or 2, p is 1 or 0, and $R^5$ and $R^6$, independently for each $X^1$, mutually independently denote hydrogen or $C_1$ to $C_6$ alkyl, preferably hydrogen, methyl or ethyl, $X^1$ means carbon and m means an integer from 4 to 7, preferably 4 or 5, with the proviso that on at least one atom $X^1$, $R^5$ and $R^6$ are simultaneously alkyl.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis(hydroxyphenyl) ethers, bis(hydroxyphenyl) sulfoxides, bis(hydroxyphenyl) ketones, bis-(hydroxyphenyl) sulfones and α,α-bis-(hydroxyphenyl)-diisopropylbenzenes as well as the ring-brominated and/or ring-chlorinated derivatives thereof. Particularly preferred aromatic dihydroxy compounds are 4,4'-dihydroxydiphenyl, bisphenol A, 2,4-bis(4-hydroxyphenyl)-2-methylbutane, 1,1-bis(4-hydroxyphenyl) cyclohexane, 1,1-bis(4-hydroxyphenyl)-3.3.5-trimethylcyclohexane, 4,4'-dihydroxydiphenyl sulfide, 4,4'-ihydroxydiphenyl sulfone and the di- and tetrabrominated or chlorinated derivatives thereof such as for example 2,2-bis (3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-bis-(4-hydroxyphenyl)propane (bisphenol A) is particularly preferred.

The aromatic dihydroxy compounds may be used individually or as any desired mixtures. The aromatic dihydroxy compounds are known.

Chain terminators suitable for the production of thermoplastic, aromatic polycarbonates include phenol, p-chlorophenol, p-tert.-butylphenol or 2,4,6-tribromophenol, and also long-chain alkylphenols, such as 4-(1,3-tetramethylbutyl)phenol according to DE-A 2 842 005 or monoalkylphenol or dialkylphenols with a total of 8 to 20 C atoms in the alkyl substituents, such as 3,5-di-tert-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used amounts in general to between 0.5 mol %, and 10 mol %, relative to the total number of moles of the diphenols used in each case.

The thermoplastic, aromatic polycarbonates may be branched in known manner, preferably by incorporating 0.05 to 2.0 mol %, relative to the total of the aromatic dihydroxy compounds used, of compounds having functionalities of three of more for example those with three or more phenolic groups.

Both homopolycarbonates and copolycarbonates are suitable. To produce copolycarbonates according to Component A according to the invention, it is also possible to use 1 to 25 wt. %, preferably 2.5 to 25 wt. % (relative to the total quantity of aromatic dihydroxy compounds to be used) of polydiorganosiloxanes with hydroxyaryloxy terminal groups. These are known (for example U.S. Pat. No. 3,419, 634) or may be produced using processes known from the literature. The production of copolycarbonates containing polydiorganosiloxanes is described in DE-A 3 334 782 for example.

In addition to bisphenol A homopolycarbonates, preferred polycarbonates are the copolycarbonates of bisphenol A with up to 15 mol %, relative to the total number of moles of aromatic dihydroxy compounds, of aromatic dihydroxy compounds other than those stated to be preferred or particularly preferred.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in the ratio of between 1:20 and 20:1. When producing polyester carbonates, a carbonic acid halide, preferably phosgene, is additionally used as a bifunctional acid derivative. In addition to the monophenols already mentioned, suitable chain terminators for the production of aromatic polyester carbonates are the chloroformic acid esters of said monophenols as well as the acid chlorides of aromatic monocarboxylic acids, which may optionally be substituted by $C_1$ to $C_{22}$ alkyl groups or by halogen atoms, and aliphatic $C_2$ to $C_{22}$ monocarboxylic acid chlorides. The quantity of chain terminators amounts in each case to 0.1 to 10 mol %, relative, in the case of phenolic chain terminators, to the moles of aromatic dihydroxy compounds and, in the case of mono-carboxylic acid chloride chain terminators, to the moles of dicarboxylic acid dichlorides. Aromatic hydroxycarboxylic acids may also be incorporated into the aromatic polyester carbonates.

The aromatic polyester carbonates may be both linear and branched in known manner (see in this respect DE-A 2 940 024 and DE-A 3 007 934).

The branching agents used may be for example tri- or polyfunctional carboxylic acid chlorides, such as trimesic acid trichloride, cyanuric acid trichloride, 3,3'-4,4'-benzophenone tetracarboxylic acid tetrachloride, 1,4,5,8-napthalene tetracarboxylic acid tetrachloride or pyromellitic acid tetrachloride, in quantities of 0.01 to 1.0 mol % (relative to the dicarboxylic acid dichlorides used) or tri- or polyfunctional phenols, such as phloro-glucinol, 4,6-dimethyl-2,4,6-tri-(4-hydroxyphenyl)-hept-2-ene, 4,4-dimethyl-2,4-6-tri-(4-hydroxyphenyl)heptane, 1,3,5-tri-(4-hydroxyphenyl) benzene, 1,1,1-tri-(4-hydroxyphenyl)ethane, tri-(4-hydroxyphenyl)phenylmethane, 2,2-bis[4,4-bis(4-hydroxyphenyl)-cyclohexyl]propane, 2,4-bis(4-hydroxyphenylisopropyl)phenol, tetra-(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra-(4-[4-hydroxyphenyl isopropyl]phenoxy)-methane, 1,4-bis[4, 4'-dihydroxytriphenyl)methyl]benzene, in quantities of 0.01 to 1.0 mol % relative to the aromatic dihydroxy compounds used. Phenolic branching agents may be initially introduced with the aromatic dihydroxy compounds, while acid chloride branching agents may be introduced together with the acid dichlorides.

The proportion of carbonate structural units in the thermoplastic, aromatic polyester carbonates may vary as desired. The proportion of carbonate groups preferably amounts to up to 100 mol %, in particular up to 80 mol %, particularly preferably up to 50 mol %, relative to the total number of ester groups and carbonate groups. Both the ester and the carbonate moieties of the aromatic polyester carbonates may be present in the polycondensate in the form of blocks or randomly distributed.

The relative solution viscosity ($\eta_{rel}$) of the aromatic polycarbonates and polyester carbonates is in the range from 1.18 to 1.4, preferably 1.20 to 1.32 (measured using solutions of 0.5 g polycarbonate or polyester carbonate in 100 ml methylene chloride solution at 25° C.).

Polyamides are well known resins that are available in commerce. Their structure, properties and methods of preparation have been widely reported, for example in U.S. Pat. Nos. 6,506,826, 6,500,881; 6,506,826; 6,515,058; 6,103,805; 6,258,927; 6,323,272; all incorporated herein by reference.

The composition may contain, as further components, any additive conventionally used, such as fillers, other compatible plastics, antistatic agents, antioxidants, flameproofing agents, lubricants and UV stabilizers. Suitable fillers include glass fibers, talc, clays, including nanoclay and silica, including nanosilica. Suitable UV absorbers include hydroxyl-benzophenones, hydroxybenzotriazoles, hydroxybenzotriazines, cyanoacrylates, oxanilides, and benzoxazinones. Also suitable as UV absorbers are nano-sized inorganic materials including titanium oxide, cerium oxide, and zinc oxide, all having with particle size of less than about 100 nanometers. Illustrative examples of stabilizer additives are hindered amine light stabilizers; hindered phenols (such as Irganox 1076 (CAS number 2082-79-3), Irganox 1010 (CAS number 6683-19-8); phosphites (such as Irgafos 168, CAS number 31570-04-4; Sandostab P-EPQ, CAS number 119345-01-6; Ultranox 626, CAS number 26741-53-7; Ultranox 641, CAS number 161717-32-4; Doverphos S-9228, CAS number 154862-43-8), triphenyl phosphine, and phosphorous acid. Suitable flame retardant additives include phosphorus compounds such as tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, methylphosphonic acid dimethyl esters, methylphosphonic acid diphenyl esters, phenylphosphonic acid diethyl esters, triphenylphosphine oxide or tricresylphosphine oxide. Especially advantageous are compounds conforming to formula (V)

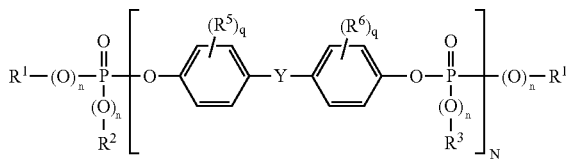
(V)

wherein
$R^1$, $R^2$, $R^3$ and $R^4$, independently one of the others denote an aryl or an alkaryl group,
N is 1 to 5, n independently of one another is 0 or 1 and q independently one of the others denotes 0, 1, 2, 3 or 4, preferably 0, 1 or 2, and $R^5$ and $R^6$ independently one of the others denote $C_1$-$C_4$-alkyl, preferably methyl, and Y represents $C_1$-$C_7$-alkylidene, $C_1$-$C_7$-alkylene, $C_5$-$C_{12}$-cycloalkylene, $C_5$-$C_{12}$-cycloalkylidene, —O—, —S—, —SO—, $SO_2$ or —CO—.

Especially preferred are compounds conforming to formula (V) that are derived from bisphenol A or methyl-substituted derivatives thereof.

The above phosphorus compounds are known (see U.S. Pat. Nos. 5,204,394, and 5,672,645 incorporated herein by reference) and may be prepared by known methods (see Ullmanns Encyklopädie der technischen Chemie, Vol. 18, p. 301 ff 1979; Houben-Weyl, Methoden der organischen Chemie, Vol. 12/1, p. 43; Beilstein Vol. 6, p. 177). Illustrated flame retardant additives also include halogenated compounds. Suitable stabilizer additives are known in the art and are disclosed in standard reference works such as "Plastics Additives Handbook", 5th edition, edited by H. Zweifel, Hanser Publishers. The additives may be used in conventional effective amounts, preferably of from 0.01 to a total of about 30% relative to the weight of the resinous components.

EXAMPLES

Compositions in accordance with the invention were prepared and their properties evaluated. Table 1 describes the synergy giving rise to the invention, demonstrated in the context of a material system that contains polyester.

The polycarbonate used was a homopolycarbonate based on Bisphenol A Makrolon 2608 polycarbonate, MFR of 13 g/10 min at 300° C., 1.2 Kg, a product of Bayer MaterialScience LLC.

Polyester-polyethylene terephthalate having inherent viscosity of 0.59, a product of Voridian Company. The exemplified compositions further contained a graft polymer (ABS; 75% rubber; styrene/acrylonitrile ratio=72:28) having no criticality in the context of the invention. The carbodiimide was Stabaxol P, a product of Rhein Chemie Rheinau GmbH. The co-stabilizer was boehmite available as Pural® 200 from Sasol Germany GmbH.

The amounts of Stabaxol P and Pural 200 shown in the following tables are parts per hundred weight (pph) of the material system that contains polycarbonate, polyester, ABS and phosphite processing stabilizer. In the preparation of exemplified compositions, the components and additives were melt compounded in a twin screw extruder ZSK 30 at a temperature profile of 120 to 270° C. Pellets thus produced were dried in a forced air convection oven at 120° C. The tensile and Izod bars were made by injection molding at melt temperature of 265 to 285° C. and mold temperature around 75° C.

The determination of Izod impact strength was carried out using specimens ⅛" in thickness. Measurements were at 23° C., in accordance with ASTM D-256. Tensile elongation at break was determined by testing specimens ⅛" in thickness at 23° C., in accordance with ASTM D-638. Melt flow index was determined on dried pellets or molded parts (cut to small pieces) at a specified temperature and specified weight load in accordance with ASTM D-1238.

In examples A to D, all compositions contained 68.86% polycarbonate, 24.95% polyester and 5.99% graft polymer. A phosphite processing stabilizer 0.2% having no criticality in the present context was also included.

TABLE 1

|  | Example | | | |
| --- | --- | --- | --- | --- |
|  | A | B | C | D |
| Carbodiimide, pph | 0.0 | 1.00 | 0.0 | 0.50 |
| Co-stabilizer, pph | 0.0 | 0.0 | 1.00 | 0.50 |

The compositions were subjected to hydrolysis (95° C., 100% relative humidity) for 7 days. Tensile elongation (%) at break and impact strength (notched Izod, ft-lb/in)) at 23° C. were measured and shown in Tables 2 and 3 respectively.

TABLE 2

| Hydrolysis duration | Tensile elongation at break (%) | | | |
|---|---|---|---|---|
| Time, day | A | B | C | D |
| 0 | 94 | 121 | 126 | 137 |
| 1 | 56 | 60 | 103 | 102 |
| 3 | 38 | 52 | 108 | 101 |
| 5 | 27 | 40 | 75 | 99 |
| 7 | 18 | 42 | 49 | 101 |

TABLE 3

| Hydrolysis duration | Notched Izod impact (ft-lb/in) | | | |
|---|---|---|---|---|
| Time, day | A | B | C | D |
| 0 | 16.2 | 16.3 | 17.0 | 16.2 |
| 1 | 11.5 | 12.8 | 7.0 | 14.8 |
| 3 | 3.5 | 11.7 | 4.5 | 13.8 |
| 5 | 2.6 | 11.7 | 3.1 | 13.5 |
| 7 | 2.1 | 11.0 | 1.6 | 12.7 |

The change (%) in melt flow of a molded article made of the composition as function of time of exposure to hydrolysis is shown in Table 4

TABLE 4

| | Percent change of melt flow index of molded part at 265° C., 5 Kg | | | |
|---|---|---|---|---|
| Time, day | A | B | C | D |
| 0 | 0 | 0 | 0 | 0 |
| 1 | 40 | 24 | 26 | 14 |
| 5 | 77 | 41 | 54 | 23 |
| 7 | 166 | 58 | 93 | 37 |

Compositions containing polycarbonate and ABS at a weight ratio of about 70/30 were evaluated as to their resistance to hydrolysis. The polycarbonate used in these examples was homopolycarbonate based on Bisphenol-A having a melt flow index of about 13 g/10 min (Bayer MaterialScience Makrolon 2608 polycarbonate). The ABS used included a mixture of SAN and ABS the rubber content of which was about 75%; the compositions also contained a small amount of conventional additives having no criticality in the present context.

The evaluation enables comparison between the performance of compositions stabilized by the inclusion of the stabilizer mixture of the invention and a corresponding composition that included but one of the components of the stabilizer mixture, the results demonstrating the synergy characterizing the inventive mixture. Tables 5-6 summarize the results. Significantly, a corresponding comparison wherein the resinous composition included polycarbonate only showed no synergy.

TABLE 5

| | Example | | | |
|---|---|---|---|---|
| | 1 | 2 | 3 | 4 |
| Co-stabilizer, pph | 0.0 | 1.00 | 0.0 | 0.50 |
| Carbodiimide, pph | 0.0 | 0.0 | 1.00 | 0.50 |

The pellets of compositions 1 to 4 were subjected to hydrolysis (95° C., 100% relative humidity) for 7 days and the melt flow indices (@ 240° C./5 kg) were determined. The table shows the percent change in the respective of melt flow indices.

TABLE 6

| Hydrolysis duration | Percent change of melt flow index of pellets at 240° C., 5 kg | | | |
|---|---|---|---|---|
| time, days | 1 | 2 | 3 | 4 |
| 0 | 0 | 0 | 0 | 0 |
| 1 | 31.5 | 14.7 | 9.9 | 3.2 |
| 3 | 30.8 | 5.8 | 7.9 | 3.7 |
| 5 | 92.1 | 28.1 | 16.7 | 2.9 |
| 7 | 168.3 | 51.3 | 29.5 | 13.8 |

The results point to the synergy that characterize the inventive stabilizer mixture.

The invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting of:
   A) a polymeric system selected from the group consisting of: polyester, polyamide, polycarbonate and blends thereof;
   B) optionally, a graft polymer;
   C) a carbodiimide;
   D) a stabilizer selected from the group consisting of aluminum oxide and aluminum oxyhydride; and
   E) optionally, one or more components selected from the group consisting of: fillers, antistatic agents, lubricants and UV stabilizers, wherein the UV stabilizers are selected from the group consisting of: hydroxyl-benzophenones, hydroxybenzotriazoles, hydroxybenzotriazines, cyanoacrylates, oxanilides, benzoxazinones, nano-sized titanium oxide, nano-sized cerium oxide, and nano-sized zinc oxide.

2. The thermoplastic molding composition of claim 1, wherein the graft polymer is present.

3. The thermoplastic molding composition of claim 2, wherein the graft polymer consists of acrylonitrile butadiene styrene (ABS) and styrene acrylonitrile (SAN).

4. The thermoplastic molding composition of claim 1, wherein the carbodiimide is:

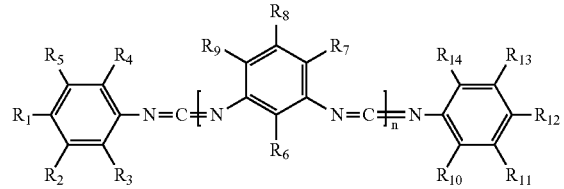

where $R^1$-$R^{14}$ independently one of the others denote a member selected from the group consisting of hydrogen, halogen, aliphatic, aromatic, cycloaliphatic and alkoxy radicals and n is 1 to 500.

5. The thermoplastic molding composition of claim 4, wherein n is 1 to 100.

6. The thermoplastic molding composition of claim 5, wherein n is 3 to 50.

7. The thermoplastic molding composition of claim 6, wherein the carbodiimide is:

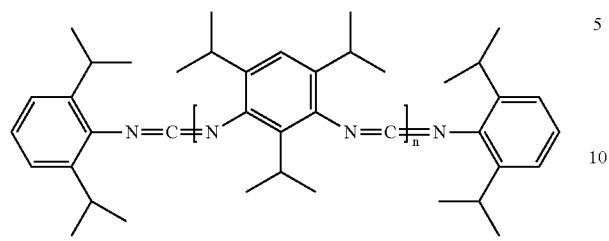

where n is 5 to 50.

8. The thermoplastic molding composition of claim 1, wherein stabilizer D) is selected from the group of boehmite and pseudoboehmite.

9. The thermoplastic molding composition of claim 1, wherein the particle size of component D) is 1 to 100 nm.

10. The thermoplastic molding composition of claim 1, wherein the fillers of component E) are selected from the group consisting of: glass fibers, talc, clays, nanoclays, silica and nanosilica.

11. The thermoplastic molding composition of claim 1, wherein the UV stabilizer is present.

* * * * *